United States Patent [19]

Werjefelt

[11] Patent Number: 5,318,250
[45] Date of Patent: * Jun. 7, 1994

[54] PILOT VISUAL ASSURANCE APPARATUS FOR AN AIRCRAFT COCKPIT

[76] Inventor: Bertil Werjefelt, P.O. Box 5011, Kaneohe, Hi. 96744

[ * ] Notice: The portion of the term of this patent subsequent to Apr. 13, 2010 has been disclaimed.

[21] Appl. No.: 943,828

[22] Filed: Sep. 11, 1992

[51] Int. Cl.⁵ ........................ B64D 13/00; A62B 17/04
[52] U.S. Cl. ............................. 244/118.5; 128/201.23
[58] Field of Search .................. 244/118.5, 121, 129.2; 128/200.28, 205.26, 201.25, 201.23, 201.29; 169/49, 50, 62

[56] References Cited

U.S. PATENT DOCUMENTS

| 2,051,730 | 8/1936 | McCandles | 128/200.28 |
|---|---|---|---|
| 4,154,237 | 5/1979 | Courter | 244/118.5 |
| 4,481,445 | 11/1984 | Levine | 244/118.5 |
| 4,508,115 | 4/1985 | Warncke | 128/201.23 |
| 4,559,939 | 12/1985 | Levine et al. | 128/201.28 |
| 4,766,893 | 8/1988 | Drews | 128/201.29 |
| 4,832,287 | 5/1989 | Werjefelt | 244/118.5 |
| 5,039,035 | 8/1991 | Fitzpatrick | 244/118.5 |
| 5,165k,625 | 11/1992 | Gutman | 244/118.5 |
| 5,202,796 | 4/1993 | Werjefelt | 244/118.5 |

Primary Examiner—Michael S. Huppert
Assistant Examiner—Virna Lissi Ansley
Attorney, Agent, or Firm—Shlesinger Arkwright & Garvey

[57] ABSTRACT

A visual assurance apparatus for an aircraft includes an inflatable enclosure which is in a normally uninflated state. When inflated, the inflatable enclosure defines a visual path between the pilot and the windshield and between the pilot and the instrument panel. Thus, the pilot can see even when dense smoke is present in the cockpit.

17 Claims, 9 Drawing Sheets

PILOT VISUAL ASSURANCE APPARATUS FOR AN AIRCRAFT COCKPIT

FIELD OF THE INVENTION

The present invention relates generally to an apparatus to enable a pilot to safely guide his or her aircraft despite the presence of air-borne particulate matter in the cockpit area, and a system therefor.

BACKGROUND OF THE INVENTION

Conventional aircraft generally have systems for evacuating air-borne particulates, such as smoke, resulting from emergencies such as onboard fires. Typical systems include oxygen masks and smoke goggles for the pilots, so that the pilot or pilots can continue to breathe and so that the smoke is prevented from irritating the eyes, respectively.

There are likewise known smoke evacuation systems that function to remove smoke from the cockpit area. In the presence of very dense smoke, such conventional systems are unable to adequately remove sufficient amounts of air-borne particulates so that the pilot can see clearly.

Accordingly, a need has been shown for even better and more failure-proof systems.

U.S. Pat. No.4,832,287 to Werjefelt includes a transparent inflatable visual assurance unit which can be automatically or manually deployed and inflated. A source of clear inflating gas inflates the inflatable visual assurance unit. A hood, which is likewise connected to a source of clear inflating gas, is provided for the pilot. Although this earlier system works well, I have improved upon it by my present invention described below.

OBJECTS AND SUMMARY OF THE INVENTION

It is an object of the present invention to provide a visual assurance system for aircraft pilots that overcomes drawbacks of existing systems.

It is a further object of the invention to provide a visual assurance apparatus and system compatible with various types of existing aircraft.

It is a still further object of the invention to provide a visual assurance system that can be installed properly without the use of complicated tools.

It is a yet still further object of the invention to provide a visual assurance apparatus which can be permanently installed in the cockpits of existing aircraft.

It is a further object of the invention to provide a visual assurance system which is relatively inexpensive to install, so that its use will be more widespread, resulting in the saving of lives.

It is yet another object of the invention to provide a visual assurance apparatus and system that is easy to use, thereby increasing the speed of deployment and, accordingly, reducing the risk of onboard smoke-generating situations.

In summary, therefore, this invention is directed to a visual assurance apparatus and system that is accurate, inexpensive, easy to install properly, and eliminates the need for expensive tools and procedures. The visual assurance apparatus includes an inflatable enclosure having inflated and deflated states, the enclosure being configured to define a visual path when in its inflated state.

These and other objects of the invention will become apparent from the following detailed description.

DETAILED DESCRIPTION OF THE INVENTION

Figure 1:
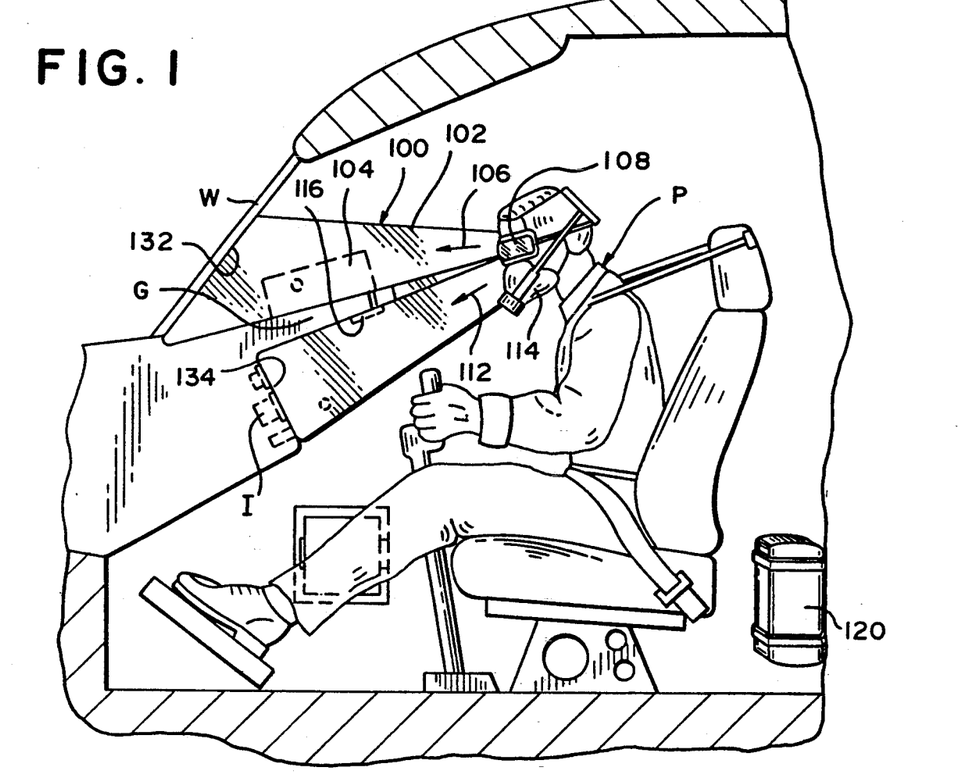
FIG. 1 is a partial, schematic view of an aircraft cockpit, showing an apparatus according to the present invention in its deployed, inflated state defining a visual path between the pilot and the aircraft windshield and between the pilot and the instrument panel.

Turning to FIG. 1, a pilot visual assurance apparatus 100 according to the invention is shown in its deployed state. An inflatable enclosure 102 is inflated by a power unit 104. Inflatable enclosure 102, when inflated, defines a visual path 106 from extending from a pilot P (i.e., goggles 108 wore by pilot P) to a windshield w. A second visual path 112 extends from goggles 108 to instrument I. Pilot P wears an oxygen mask 114 along with goggles 108. A clamp 116 can be used to restrain visual assurance apparatus 100 in place on a glare shield G.

Figure 2:
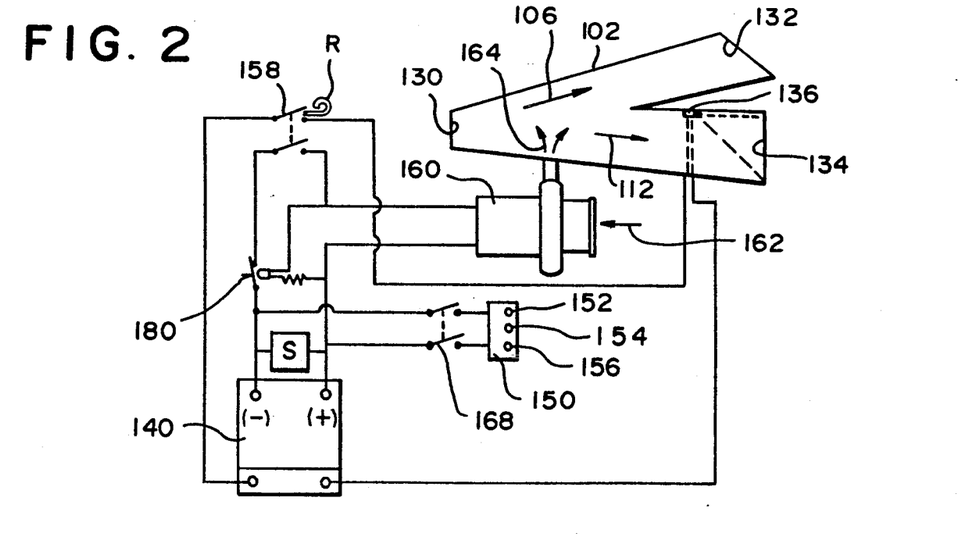
FIG. 2 is a schematic diagram of the apparatus according to the invention.

FIG. 2 schematically illustrates a preferred manner of operating the visual assurance apparatus according to the invention.

FIG. 2 likewise makes apparent that visual path 106 extends from a clear end surface 130 of inflatable enclosure 102 to a second end surface 132 which is likewise substantially clear. Visual path 112 extends from clear end surface 130 to a third clear end surface 134. An optional illuminating means 136, such as a light; can be placed inside inflatable enclosure 102 for enhancing the operation thereof by illuminating clear end surface 134 and, hence, instrument panel I, for example. Light 136 is electrically connected to a power source 140, in a manner which will readily appreciated by a person having ordinary skill in the art.

Power source 140 is preferably a stand-alone power source, such as a battery, so that the operation of visual assurance apparatus 100 is independent of the power source of the aircraft, so that the visual assurance apparatus operates even when no other power is available.

An indicator panel 150 (e.g., a battery status display panel) has a series of indicator lights indicating the state of battery 140. For example, a green indicator light 152 can correspond to a fully charged, "good" or "ok" state; a yellow indicator light 154 can indicate a low charge, "replace" state; and a red indicator light 156 can indicate a discharged, "inoperable" state. An on/off switch 158 electrically connects and disconnects blower 160 as well as light 136 with power source 140, as shown. Blower 160, when powered, draws in ambient fluid 162, such as particulate-laden air, filters out light-blocking particles in a known manner with a filter, and discharges filtered fluid 164 (e.g., filtered, clear, colorless air) into inflatable enclosure 102. A battery test switch 168 is electrically corrected between indicator panel 150 and power source 140. A control switch 180 serves to electrically remove power source 140 from the remainder of the system.

A voltage sensor/switch combination S is preferably electrically connected to two or more batteries 140, the front one of which is shown. In the case of a system using two batteries 140, voltage sensor/switch combination S determines whether one or both of batteries 140 is electrically connected for powering blower 160. Voltage sensor/switch combination S determines whether one or both batteries 140 is electrically connected for powering blower 160.

In the case of a two-battery system, when visual assurance apparatus 100 is turned on, both batteries 140 are electrically connected for driving blower 160 at a high rate of speed for filling inflatable enclosure 102 rapidly with filtered ambient air 164.

After a short period of time, inflatable enclosure 102 will be in its fully inflated state, such as shown in FIGS. 1 and 2. Accordingly, blower 160 need only operate at a relatively low speed for maintaining adequate inflation of inflatable enclosure 102. Adequate inflation means that visual paths 106 and 112 are visually unobstructed such as by obstructions including partially collapsed portions of inflatable enclosure 102. A reliable means for driving blower 160 at a lower rate of speed is to simply calculate the voltage drop which will occur owing to the discharge of two batteries 140 during the initial rapid deployment of inflatable enclosure 102, and calibrating the voltage sensor/switch combination S accordingly. Voltage sensor/switch combination S electrically "cuts out" one of the two batteries 140 when the predetermined voltage drop is reached, and blower 160 is driven at a slower rate of speed.

As will be readily appreciated by person having ordinary skill in the art, a conventional timer may be used instead of or in combination with voltage sensor/switch combination S. When a timer is used, a standard, preset time will be entered based on the average time for filling inflatable enclosure 102 with filtered ambient air 164, and an internal clock of such timer will be appropriately calibrated.

Turning to FIGS. 3-8, a couple of preferred embodiments of the invention having separate power units that are particularly suited for permanent installation in the cockpit of aircraft are shown.

Figure 3:
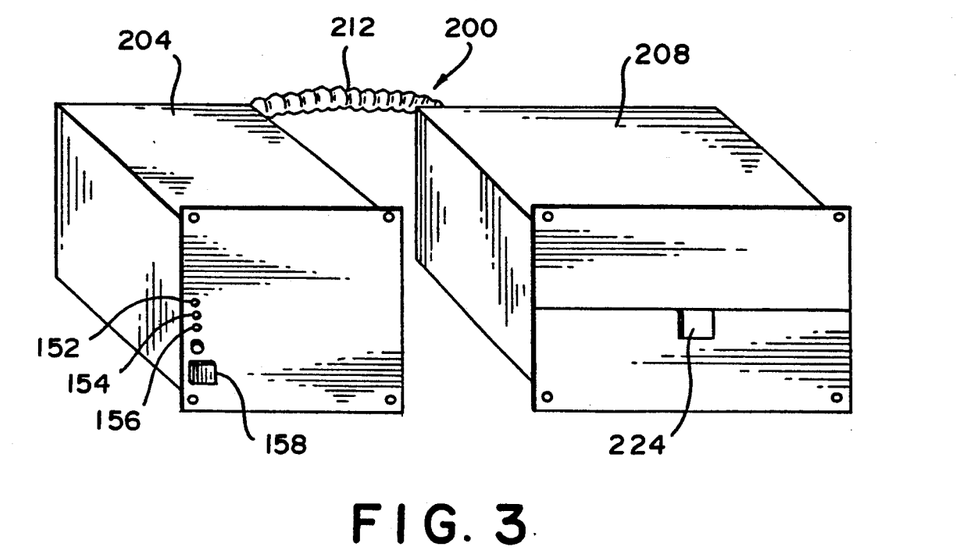
FIG. 3 is a perspective view of one of the preferred embodiments of the apparatus according to the invention.
Figure 4:
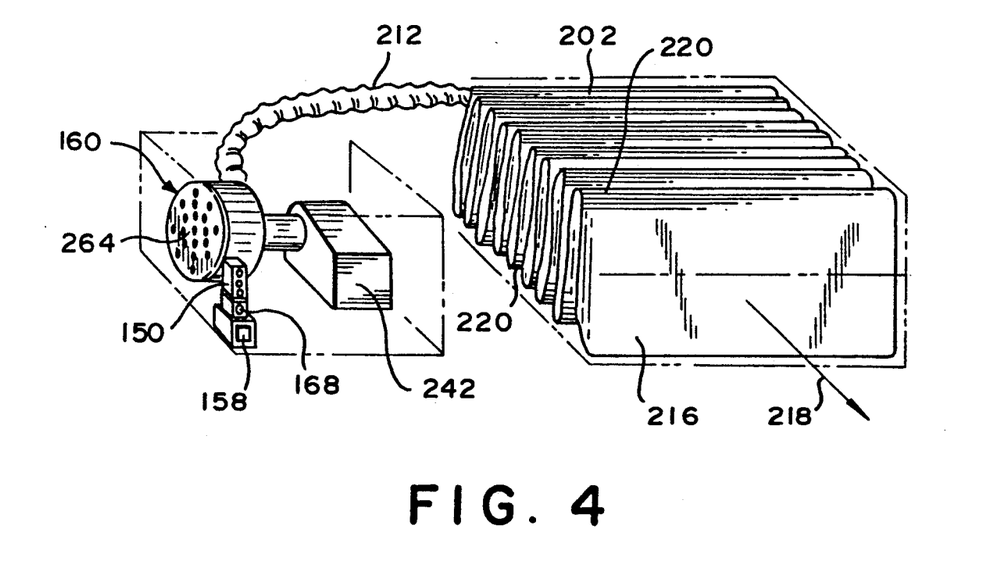
FIG. 4 is a perspective view of details of the inside of the preferred embodiment of FIG. 3.

FIGS. 3 and 4 illustrate a visual assurance apparatus 200 including a power unit 204 separate from an inflatable enclosure housing 208. A hose 212 extends therebetween. A power source is provided in a battery housing 242, the battery being electrically connected to a battery status display panel 250, in manner such as suggested by the schematic diagram of FIG. 2. A filter 264 is schematically shown associated with blower 162. Inflatable enclosure 202 is schematically illustrated as an accordion fold or fan-fold type.

Inflatable enclosure 202 is fluidly connected to blower 160 by hose 212. A free end 216 of inflatable enclosure 202 will be one of the first of a plurality of folded portions 220 to extend outwardly in a direction of extension 218 when inflatable enclosure 202 is inflated. A pull tab 224 assists in removing a front panel for exposing inflatable enclosure 202 when ready for inflation.

Figure 5:
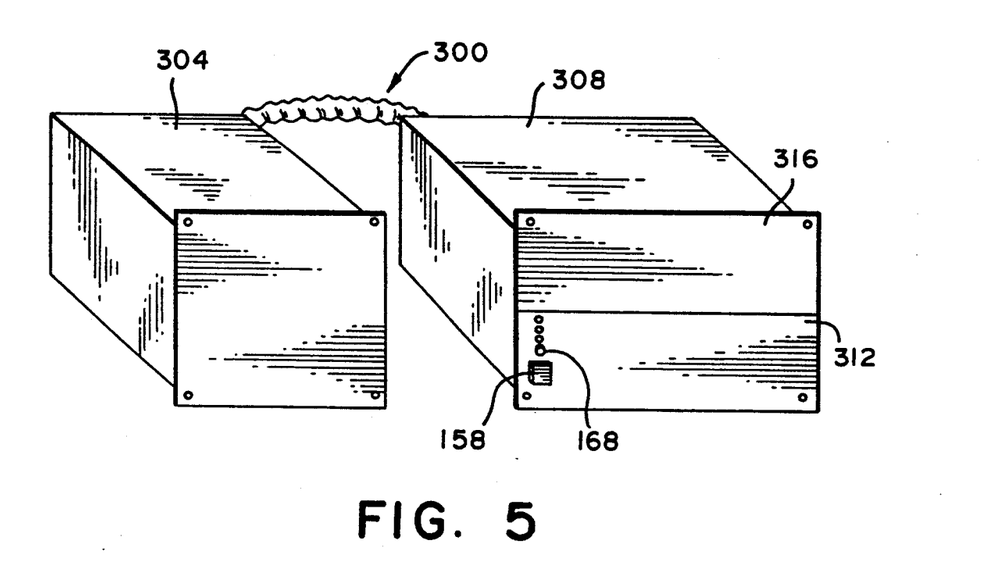
FIG. 5 is a perspective view of a further preferred embodiment of the invention.
Figure 6:
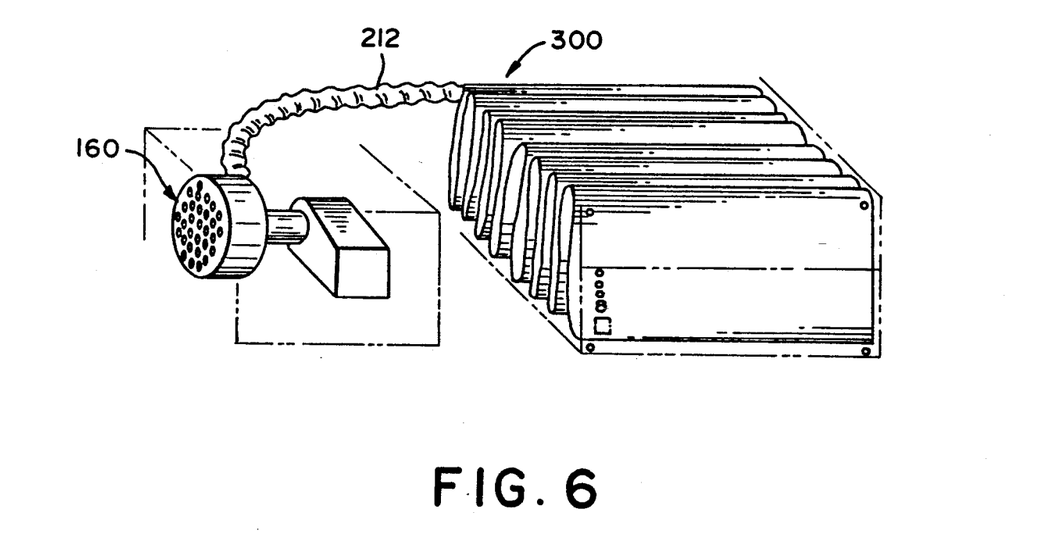
FIG. 6 is a perspective view of the inside of the preferred embodiment of FIG. 5.

FIGS. 5 and 6 illustrate a further preferred embodiment of the invention, similar to the embodiments of FIGS. 3 and 4, in which a visual assurance apparatus 300 has a power unit 304 and an inflatable enclosure housing unit 308.

Visual assurance apparatus 300 includes a lower control panel 312 at the front thereof and a removable upper panel 316 above control panel 312. Lower control panel 312 includes the electrical controls for visual assurance apparatus 300, such as on/off switch 158 and battery test switch 168. This embodiment allows separate power unit 304 to be placed at any desired location in the aircraft distant from inflatable enclosure housing unit 308, because power unit 304 only needs to be accessed for service and maintenance, not for deployment purposes.

Figure 7:
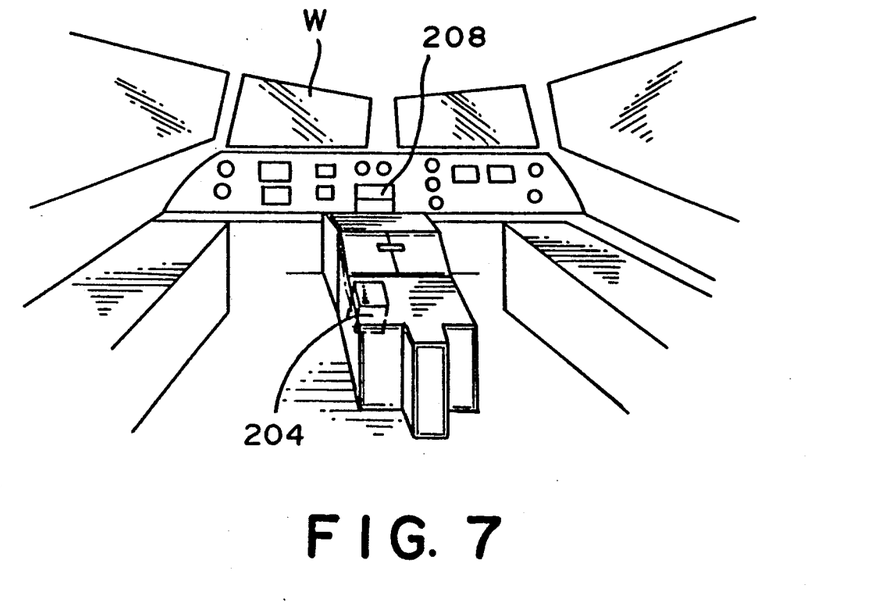
FIG. 7 is a schematic view of the cockpit of an airplane in which a first part of the apparatus according to the invention is placed in the aircraft instrument panel and a second part of the apparatus is placed inside the main console.

FIG. 7 shows the embodiment of FIGS. 3 and 4 installed in an aircraft cockpit, power unit 204 being installed in a centrally located console extending between the conventional two pilots seated on the left and right of the aircraft.

Figure 8:
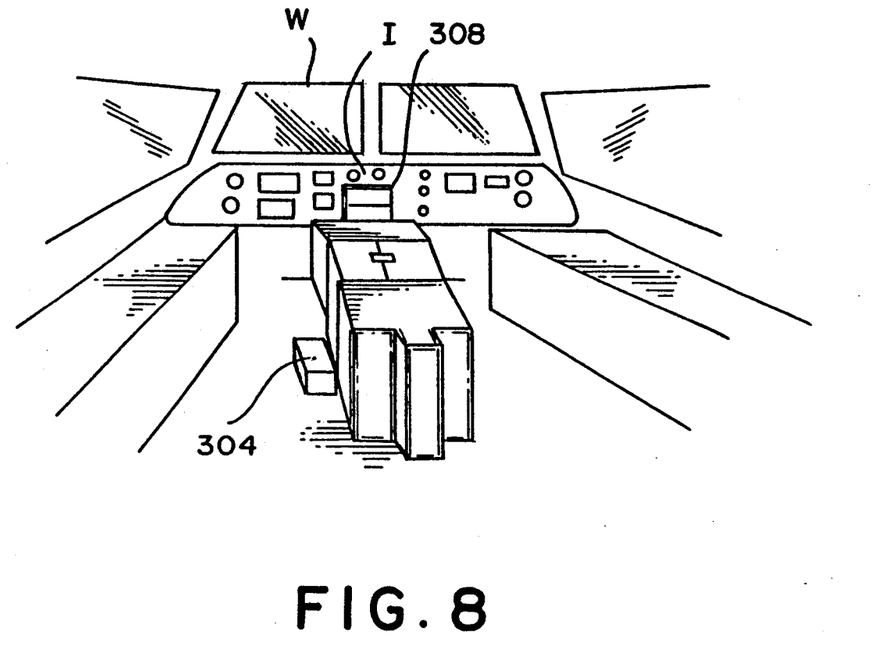
FIG. 8 is a view similar to FIG. 7, in which a second part of the apparatus is placed on the floor of the aircraft.

FIG. 8 shows the manner in which inflatable enclosure housing unit 308 of the embodiment of FIGS. 5 and 6 is installed in the instrument panel of the cockpit of the aircraft, while power unit 304 is located on the floor, such as below the pilot's seat (not shown).

Figure 9:
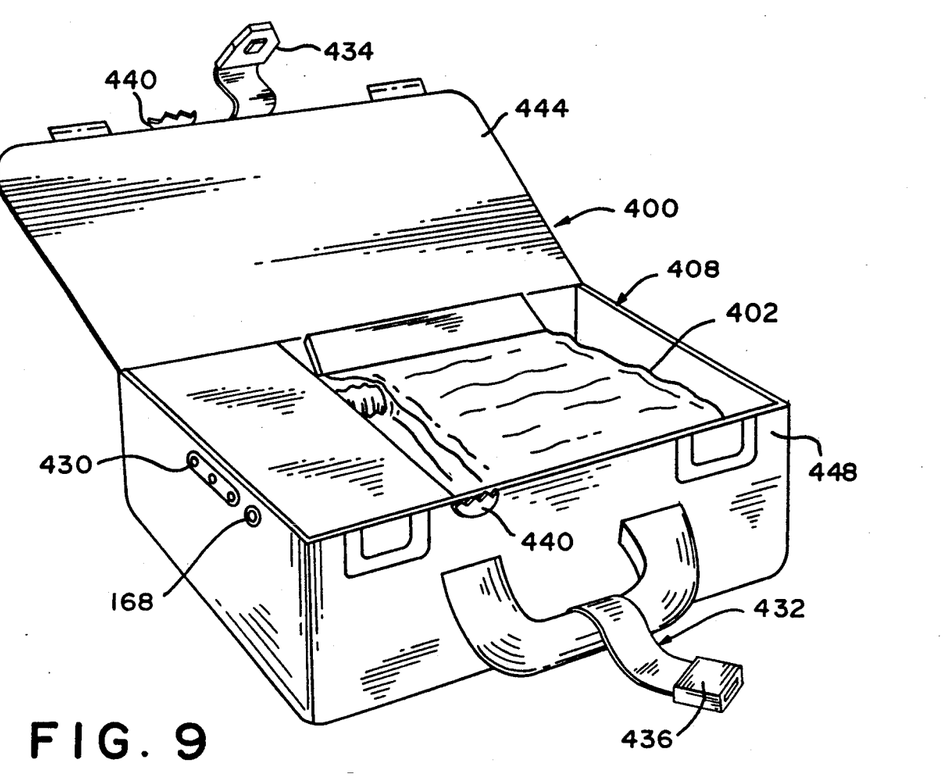
FIG. 9 is a perspective view of the apparatus according to a preferred, portable embodiment.
Figure 10:
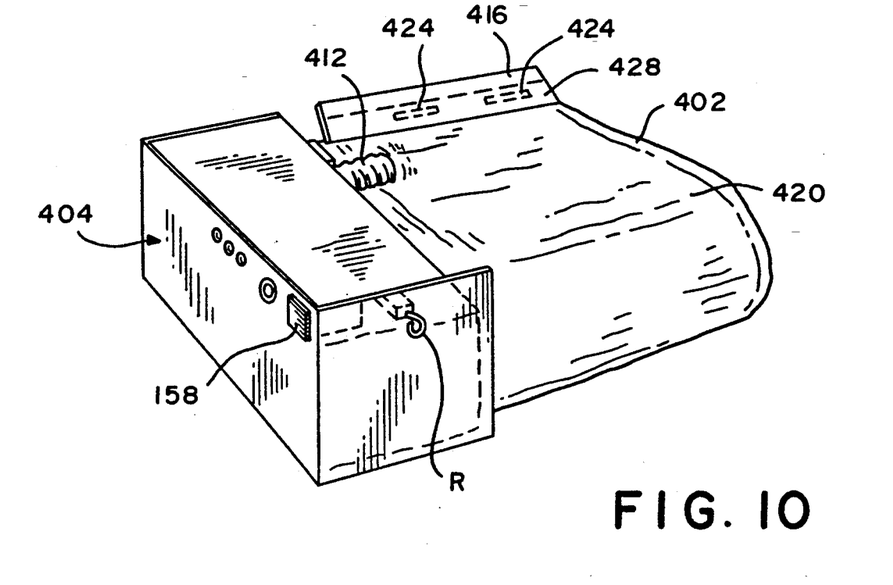
FIG. 10 is a perspective view of the inside of the apparatus of FIG. 9.

FIGS. 9 and 10 show a further preferred embodiment of the invention, in which a visual assurance apparatus 400 includes an inflatable enclosure 402 and a directly adjacent power unit 404.

A portable, metal housing 408, such as a briefcase or suitcase, is used for transporting and compactly stowing visual assurance apparatus 400. Tube 412 fluidly connects power unit 404 to inflatable enclosure 402, in a manner similar to the fluid connection in the previous embodiments. A pull tab 416 is attached to a cover 420 which encloses at least a part of inflatable enclosure 402 in order to maintain inflatable enclosure 402 in a properly folded or rolled-up state for ready deployment. Preferably, pull tab 416 includes a message on a front face thereof, such as "pull here" or "pull to open".

Conveniently, cover 420 simply surrounds at least a top part of folded inflatable enclosure 402 in the manner of a large, open-ended strap and is held in place by readily detachable tabs, such as conventional hook and loop fasteners 424 placed at a free end 428 of cover 420.

A window 430 is provided for allowing the pilot to visually check the status of the battery without opening metal housing 408.

A strap 432 similar to a conventional safety belt serves not only as a means for keeping metal housing 408 closed, but also functions as a means for securing visual assurance apparatus 400 to a surface in the cockpit when visual assurance apparatus 400 is stowed. A male end 434 is shown disconnected from a female end 436. As will be readily appreciated by a person having ordinary skill in the art, when in use, male end 434 and female end 436 can be attached to respective female and male ends of safety belts found in the typical aircraft, or added for the purpose of restraining visual assurance apparatus 400, when in use, such as instead of or in conjunction with clamp 116.

An optional tamper-indicator 440, e.g., a seal attached to lid 444 and bottom 448 of metal housing 408 gives the user a quick visual indication as to whether metal housing 408 has been opened, such as by an unauthorized user.

Turning to FIGS. 11–14, a spirally wound inflatable enclosure 502 is shown having an upper portion 503 and a lower portion 505.

A fluid connection port 540 fluidly connects inflatable enclosure 502 to a blower, as described above.

Figure 11:
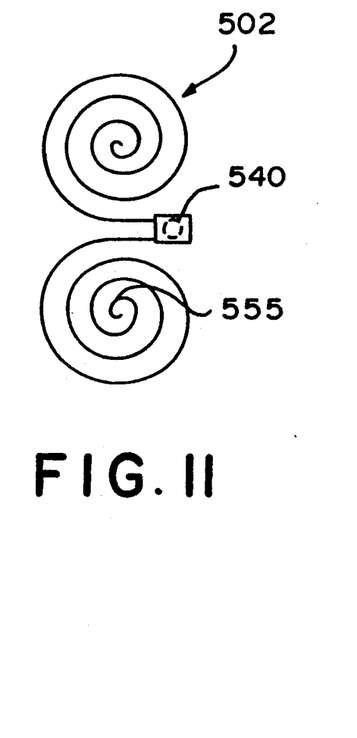
FIG. 11 is a schematic view of one of the preferred configurations of the inflatable enclosure according to the invention, in its deflated state.

FIG. 11 shows spirally wound inflatable enclosure 502 in its normally rolled-up state ready to be deployed.

Figure 12:
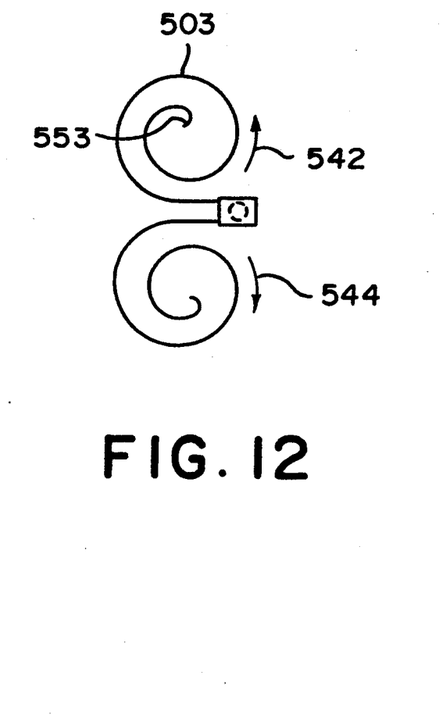
FIG. 12 is a schematic view of the embodiment of FIG. 11, showing the inflatable enclosure according to the invention beginning to inflate.

FIG. 12 shows spirally wound enclosure 502 a few moments after the deployment has begun. After initiation of the inflating of enclosure 502, upper portion 503 begins unrolling, such as in a counterclockwise direction 542 shown in FIG. 12, while lower portion 505 simultaneously unrolls as it is being inflated, the unrolling proceeding in a clockwise direction 544.

Figures 13, 14:
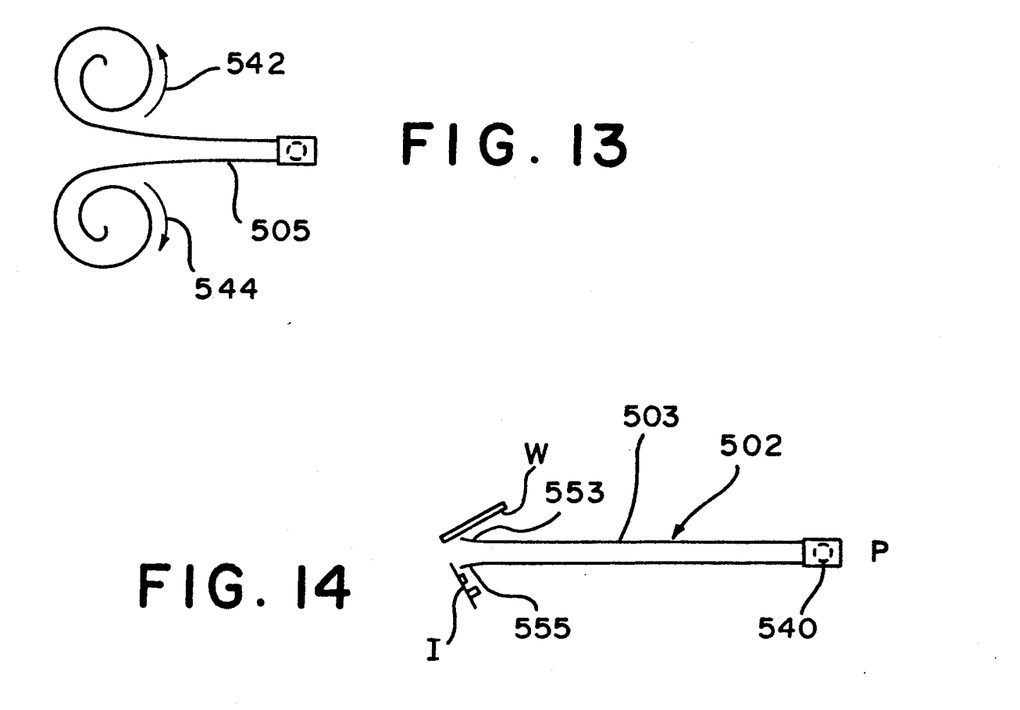
FIG. 13 is a schematic view similar to FIG. 12, showing the inflatable enclosure at a more inflated stage.
FIG. 14 is a schematic view similar to FIG. 12 showing the inflatable enclosure in a fully inflated position.

FIG. 13 illustrates the inflation of inflatable enclosure 502 a few moments after the partially inflated state shown in FIG. 12.

The fully inflated state of inflatable enclosure 502 is illustrated in FIG. 14, in which a free end 553 of upper portion 503 is adjacent windshield W. Likewise, a free end 555 of lower portion 505 is disposed adjacent instrument panel I. In this manner, visual paths are established between pilot P and windshield W, as well as between pilot P and instrument panel I, similar to the visual paths shown in FIGS. 1 and 2 described above.

Figure 15:
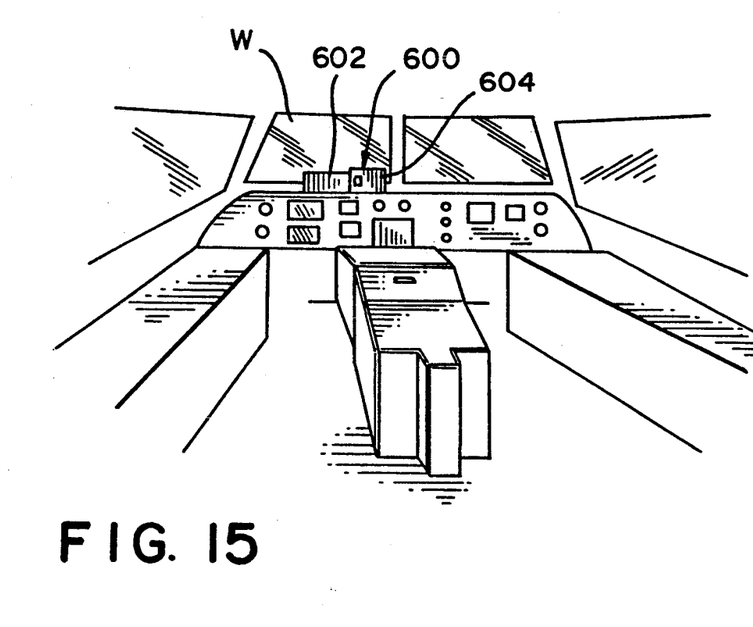
FIG. 15 is a schematic view similar to FIG. 7, showing the placement of a portable apparatus according to a preferred embodiment of the invention.

FIG. 15 shows a typical installation of the visual assurance apparatus according to the portable embodiment of the invention, as it will be located for a pilot on the left side of the cockpit. It can be seen that inflatable enclosure 602 is disposed on the left, power unit 604 being disposed on the right. Visual assurance apparatus 600 can be used for the right hand pilot, although it is preferred that a right side model having the power unit on the left and the inflatable enclosure on the right be used.

Figure 16:
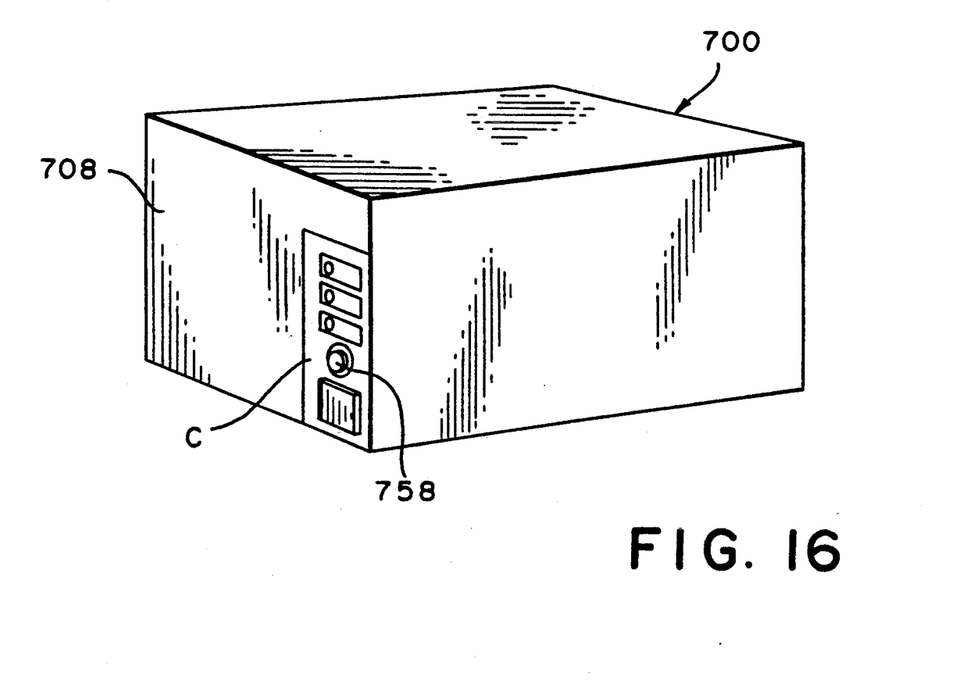
FIG. 16 is a perspective view of yet another preferred embodiment of the invention.
Figure 17:
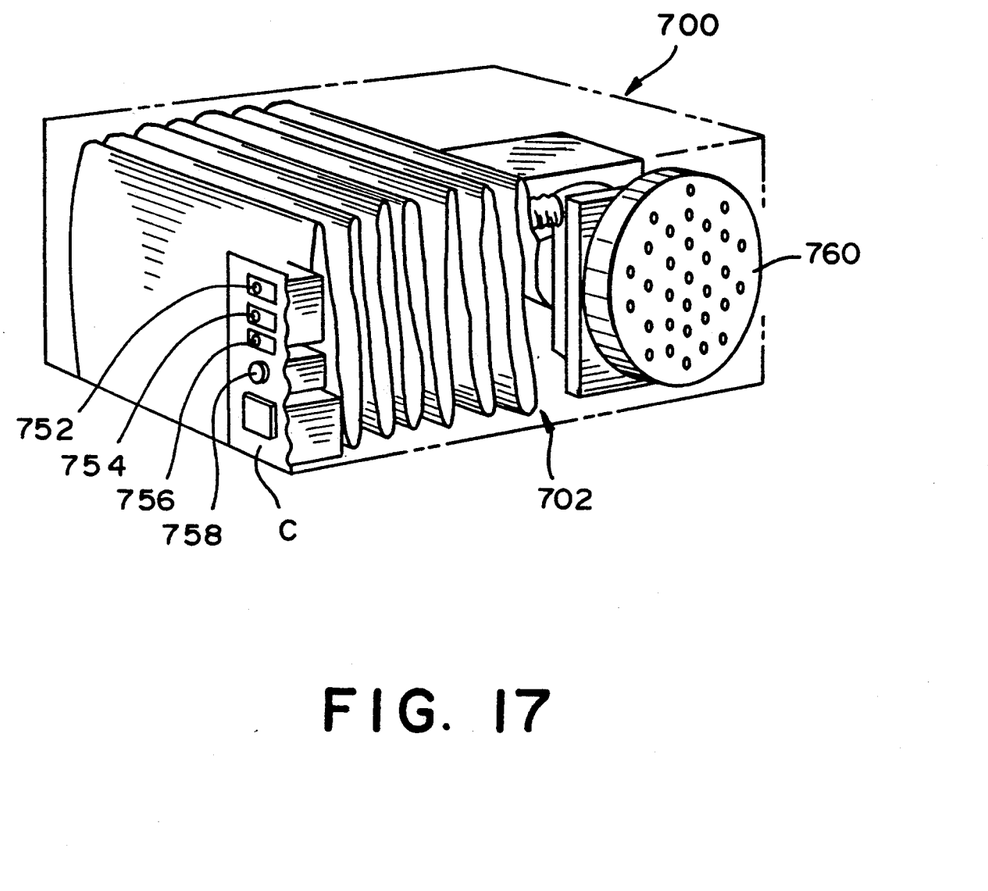
FIG. 17 is a perspective view of the preferred embodiment of FIG. 17, in which a front panel has been removed, showing the inside of the apparatus, in a stage ready for inflation.

FIGS. 16 and 17 show another preferred embodiment of the invention in which a visual assurance apparatus 700 is configured for use as either a portable or as a permanently installed unit.

A control panel c includes a removable panel 708 and a fixed control panel C. Control panel C retains battery indicator lights 752, 754, 756, as well as on/off switch 758, analogous to indicator lights 152, 154, 156 and on/off switch 158, described regarding FIG. 2 above. When removable panel 708 is separated from the remainder of visual assurance unit 700 in order to deploy inflatable enclosure 702, control panel c remains in place as best seen in FIG. 17. Conveniently, removable panel 708 can be permanently or detachably attached to inflatable enclosure 702. A blower 760 inflates inflatable enclosure 702, which in this embodiment is shown in a accordion or fan-fold configuration, upon actuation of switch 758.

Figure 18:
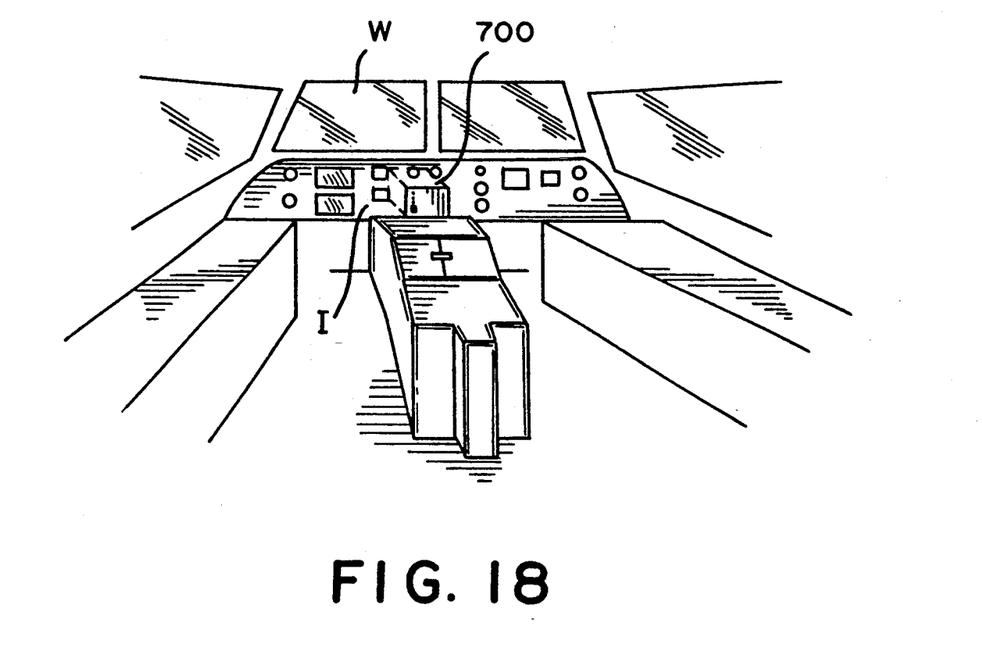
FIG. 18 is a view similar to FIG. 15, showing another preferred embodiment of the apparatus and system according to the invention.

FIG. 18 shows visual assurance unit 700 installed in instrument panel I of the cockpit of an aircraft.

Figure 19:
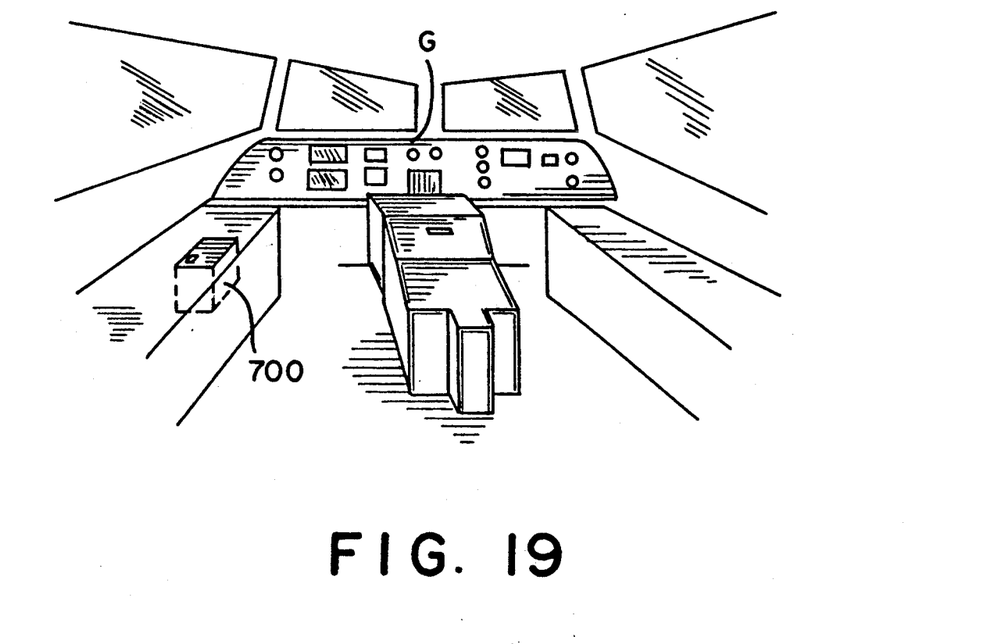
FIG. 19 is a schematic view similar to FIG. 18 showing a still further preferred installation of the invention.

FIG. 19 shows visual assurance unit 700 removably stowed in a portion of the cockpit near to the pilot. In use, removably stowed visual assurance unit 700 will be placed on glare windshield G, similar to the manner shown in FIG. 1.

Although the disclosed portable and fixed visual assurance apparatuses according to the invention are illustrated as used in an aircraft cockpit, the present invention is equally applicable to any similar environment where constant monitoring of instrument panels by an operator is required, even in the presence of particulate-laden fluids, such as smoke-filled air.

A person having ordinary skill in the art will understand that other inflatable enclosures, switches, blowers, may be used. Filtered, ambient air is merely one example of clear, colorless fluid to be used in inflating the inflatable enclosure for establishing a visual path between the operator and the objects which need to be seen. Other sources of fluid such as compressed air, compressed nitrogen, or other gases or fluids could be used.

OPERATION

When the operator's field of vision is obscured, as in the case of an in-flight smoke emergency, pilot P initiates the inflation of inflatable enclosure 102 by removing release pin R after placing visual assurance apparatus 100 on glare shield G as shown in FIGS. 1 and 2. Withdrawing retainer pin R activates or allows activation of switch 158, thereby powering blower 160 for inflating enclosure 102.

As seen in FIG. 4, for example, a filter 264 associated with blower 160 filters ambient air to remove smoke and other particulate matter. As shown in FIG. 2, filtered fluid 164 inflates enclosure 102 and establishes visual paths 106 and 112 between pilot P and windshield W and instrument panel I, respectively.

As will be appreciated, when the portable embodiments of the visual assurance apparatus, such as shown in FIGS. 9 and 10 are to be deployed, visual assurance apparatus 400 is moved into position on glare shield G in its uninflated position.

After securing visual assurance apparatus 400 in place with male end 434 and female end 436 of strap 432, as by connecting with appropriate mating couplings in the cockpit, and lid 444 having been opened, the pilot pulls pull tab 416, thereby removing cover 420 to expose inflatable enclosure 402. On/off switch 158 is then actuated, and blower 160 fills inflatable enclosure 402 with filtered air. The pilot may assist in directing the direction of deployment of inflatable enclosure 402 as it is filling up with fluid, if necessary.

As schematically shown in FIGS. 11-14, when spirally wound inflatable enclosure 502 is used, it is preferred that the spirals unwind so that inflatable enclosure 502 is deployed in the direction away from the pilot and toward the windshield and instrument panel. As will be appreciated, after inflatable enclosure 502 is no longer needed, it will be rolled up in a return direction beginning from free ends 553 and 555, rolling up upper portion 503 and lower portion 505 to resume the normal, deployable state illustrated in FIG. 11.

To assist in the rapid deployment of the inflatable enclosure, it is preferred that the blower be driven at a first, high-rate of speed for initial deployment; and, then, at a reduced rate of speed for maintaining the inflated inflatable enclosure in its inflated state. This initial, high speed inflation of the inflatable enclosure according to the invention can be achieved by use of the voltage sensor/switch combination S illustrated and described regarding FIG. 2 above. As will be readily understood by a person having ordinary skill in the art, alternative timers such as electronic clock means can be used for determining the period of time during which the blower is operated at the high rate of speed. Further, the on/off switch can be used as the sole actuator for inflating the visual assurance apparatus, without the use of the actuating pin.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

I claim:

1. A visual assurance apparatus for an aircraft cockpit, comprising:
   a) an inflatable enclosure having inflated and deflated states, said inflatable enclosure being configured to establish a visual path between a pilot and at least one of an instrument panel and a windshield of an aircraft when in said inflated state;
   b) said deflated state including said inflatable enclosure being substantially in a rolled-up configuration;
   c) said inflated state including said inflatable enclosure being in a substantially elongated configuration;
   d) said inflatable enclosure including means for permitting a pilot to see through said enclosure, thereby enabling the pilot to use the visual path established in said inflated state; and
   e) means for inflating said inflatable enclosure with a transparent fluid for changing said inflatable enclosure from said substantially rolled-up, deflated state to said substantially elongated, inflated state.

2. A visual assurance apparatus as defined in claim 1, wherein:
   a) said deflated, rolled-up state of said inflatable enclosure includes said inflatable enclosure having a substantially spirally wound configuration.

3. A visual assurance apparatus as defined in claim 1, wherein:
   a) means is provided for stowing said apparatus when not in use.

4. A visual assurance apparatus as defined in claim 3, wherein:
   a) said stowing means includes a briefcase.

5. A visual assurance apparatus for an aircraft cockpit, comprising:
   a) an inflatable enclosure having inflated and deflated states, said inflatable enclosure being configured to establish a visual path between a pilot and at least one of an instrument panel and a windshield of an aircraft when in said inflated state;
   b) said deflated state including said inflatable enclosure being substantially in an accordion fold configuration;
   c) said inflated state including said inflatable enclosure being in a substantially elongated configuration;
   d) said inflatable enclosure including means for permitting a pilot to see through said enclosure, thereby enabling the pilot to use the visual path established in said inflated state; and
   e) means for inflating said inflatable enclosure with a transparent fluid for changing said inflatable enclosure from said accordion fold, deflated state to said substantially elongated, inflated state.

6. A visual assurance apparatus as defined in claim 5, wherein:
   a) means is provided for stowing said apparatus when not in use.

7. A visual assurance apparatus as defined in claim 5, wherein:
   a) timer means is associated with said inflating means for causing said inflating means to inflate said inflatable enclosure at a first, high-rate of inflation for a predetermined period of time, and then to maintain the inflated state after the predetermined period of time.

8. A visual assurance apparatus as defined in claim 7, wherein:
   a) said inflating means includes a power source and a blower; and
   b) said timer means includes a voltage sensor operatively associated with said power source and said blower.

9. A visual assurance apparatus for an aircraft cockpit, comprising:
   a) an inflatable enclosure having inflated and deflated states, said inflatable enclosure being configured to establish a visual path between a pilot and at least one of an instrument panel and a windshield of an aircraft when in said inflated state;
   b) said deflated state including said inflatable enclosure being substantially in a rolled-up configuration;
   c) said inflated state including said inflatable enclosure being in a substantially elongated configuration;
   d) said inflatable enclosure including means for permitting a pilot to see through said enclosure, thereby enabling the pilot to use the visual path established in said inflated state;
   e) means for inflating said inflatable enclosure with a transparent fluid for changing said inflatable enclosure from said substantially rolled-up, deflated state to said substantially elongated, inflated state;

f) said inflating means includes a housing;

g) said inflating means and said housing are disposed separate from and distant from said inflatable enclosure; and h) means for conveying a fluid is disposed between said inflatable enclosure and said housing.

10. A visual assurance apparatus as defined in claim 9, wherein:

a) said fluid conveying means comprises a tube.

11. A visual assurance apparatus as defined in claim 10, wherein:

a) said inflating means includes a blower unit; and b) a filter means is operatively associated with said blower unit for filtering ambient fluid and for providing substantially transparent fluid to said blower means.

12. A visual assurance apparatus as defined in claim 4, wherein:

a) a strap is attached to said briefcase.

13. A visual assurance apparatus as defined in claim 3, wherein:

a) a strap means is connected to said stowing means for attaching said stowing means to a surface.

14. A visual assurance system, comprising:

a) an aircraft cockpit;

b) an inflatable enclosure having inflated and deflated states, said inflatable enclosure being configured to establish a visual path between a pilot and at least one of an instrument panel and a windshield of an aircraft when in said inflated state;

c) said deflated state including said inflatable enclosure being substantially in a rolled up configuration;

d) said inflated state including said inflatable enclosure being in a substantially elongated configuration;

e) said inflatable enclosure including means for permitting a pilot to see through said enclosure, thereby enabling the pilot to use the visual path established in said inflated state;

f) means for inflating said inflatable enclosure with a transparent fluid for changing said inflatable enclosure from said substantially rolled-up, deflated state to said substantially elongated, inflated state;

g) said inflating means includes a housing;

h) said inflating means and said housing are disposed separate from and distant from said inflatable enclosure; and i) means for conveying a fluid is disposed between said inflatable enclosure and said housing.

15. A visual assurance system as defined in claim 14, wherein:

a) said conveying means includes a tube.

16. A visual assurance system as defined in claim 15, wherein:

a) means for controlling operation of said inflating means is disposed on said housing.

17. A visual assurance system as defined in claim 15, wherein:

a) means for controlling operation of said inflating means is disposed on said inflating means.

* * * * *